INVENTOR.
Thomas M. Gluyas, Jr.
BY Samuel B. Smith
ATTORNEY

Patented Jan. 30, 1951 2,539,774

UNITED STATES PATENT OFFICE 2,539,774

PUSH-PULL OPERATED DOUBLE DIODE CLAMPING CIRCUIT FOR DIRECT-CURRENT REINSERTION

Thomas M. Gluyas, Jr., Collingswood, N. J., assignor to Radio Corporation of America, a corporation of Delaware Application May 27, 1947, Serial No. 750,755

11 Claims. (Cl. 178—7.1)

My invention relates, in general, to apparatus and circuits for restoring the direct current (D. C.) component to a signal from which it has either been lost or is incorrectly represented, and, more particularly, to such circuits as are especially adaptable for use with television transmission apparatus.

It is a well known fact that when signals having a direct current component are amplified by amplifiers containing transformers or amplifiers wherein the stages contain coupling condensers between the stages thereof, the D. C. component of such a signal is lost. This constitutes a problem which is especially serious in the art of television transmission and reproduction since the D. C. component is indicative of the general background brightness of the image being televised. A discussion of this phenomenon may be found in textbooks and reference may be had to pages 136 et seq. of "Television Simplified" by Kiver, published by D. Van Nostrand and Company, 1946 edition.

The missing or incorrectly represented D. C. component is usually reinserted under the control of recurring pulses bearing a predetermined relationship to a fixed datum level such as "picture black." The pulses which are used usually constitute the synchronizing pulses which bear a relationship to the referred to "picture black" level. Such circuits in themselves are well known and are represented, for instance, in U. S. Patent No. 2,299,328 to Kell; No. 2,299,945 to Wendt; No. 2,307,375 to Blumlein et al.; and No. 2,315,388 to Bedford.

Some previously known arrangements have operated by differentiating the synchronizing pulse and using a portion of the differentiated pulse so produced to set the clamping level or operating level of the apparatus at a level which is indicative of the direct current value which is missing or is incorrectly represented. In general, it may be said that this is accomplished by the use of a so-called clamping tube arrangement including a tube whose grid-cathode circuit contains a condenser whose charge is controlled in accordance with the value of signals produced by rectification of the signals under whose control the D. C. is re-inserted. Reference may be had to the previously mentioned patents for an illustration of this type of use of a clamping tube. It is an object of the present invention to provide a D. C. restoring circuit in which clamping is established while the composite video signals are operating at the level of the blanking signals which are developed in conjunction with television apparatus rather than at the level of the synchronizing signal peaks, such as is common practice.

In previous arrangements where the clamping level of the transmission apparatus has been established in accordance with the value of the peaks of the synchronizing signals, the disadvantage existed that, where the transmitter was operating without an input signal to the modulator tubes of the apparatus, the clamping level having been established in accordance with the level of the synchronizing signal peaks, the transmitter would operate continuously at this level and television transmitters normally are not designed to operate at the synchronizing peak level. Where this was true, it has been necessary to provide some type of arrangement in which the operating level of the transmitter has been brought to a value below that represented by the peaks of the synchronizing signal. It is a further and major object of this invention, therefore, to provide an arrangement by means of which the missing or misrepresented D. C. component of the televised signal may be re-established, and in which the transmitter will be brought back to the so-called "black level" of operation under conditions in which there is no input video signal.

Again, in some previous arrangements known to the prior art to which this invention pertains, the wave shape of the synchronizing pulse developed might not be exactly rectangular in shape. Where this situation existed, control pulses, which were developed from the synchronizing signal by differentiation thereof, would contribute to the setting of the clamping level during the time that the synchronizing pulse itself was being impressed on the transmitter. The result would be that the clamping level would be set at too high a value and would inaccurately represent the missing D. C. component. It is, therefore, an additional object of my invention to provide a circuit arrangement by which this disadvantage is eliminated.

It is a still further object of this invention to provide a novel circuit for developing control pulses for setting the clamping level of an apparatus under the influence of the synchronizing signals.

It is additionally an object of my invention to provide a D. C. restoring circuit which is simple, accurate, and stable.

Other objects and advantages of my invention will become apparent from a reading of the hereinafter appended specification.

My invention, in general, contemplates an arrangement in which the synchronizing signal, which has been combined with signals representative of the video components of the image undergoing scansion, is separated by well known means. The synchronizing signal appears in the output circuit of a vacuum tube and is impressed onto the primary of a pulse transformer whose secondary is connected to the input of a second vacuum tube. Current flows through the transformer during the synchronizing interval from the vacuum tube in whose output circuit the primary is located.

After the synchronizing interval, this vacuum tube is cut off and so does not load the transformer, which then will oscillate at its resonant frequency, the resonant frequency being determined by the parameters of the transformer and the tube and circuit capacities associated therewith. The oscillation is highly damped by iron in the core of the transformer and may be further damped, if desired, by means of resistance shunted across one of the windings of the transformer.

The pulse so developed is applied between the grid and cathode of a vacuum tube by means of the secondary winding of the transformer. Grid current will be drawn by the tube and a capacitor which is connected in the grid-cathode circuit will be charged to a value so that the tube itself will act as a clipper, i. e., only voltages without a predetermined range of values will be passed through the tube. The result is then that the clipper tube amplifies a pulse which has been developed at a time which is slightly delayed from the time of occurrence of the trailing edge of the synchronizing pulse which has caused its development and the delay and the developed pulse width are constant over a wide range of synchronizing pulse shapes and amplitudes.

The output pulses from the clipper tube are squared off at the top by a proper choice of the load resistance causing limiting in the tube. The pulses so developed are taken off in push-pull fashion from an output circuit, one connection of which is to the plate of clipper tube and the other connection of which is to the common terminal of the cathode of the tube and a cathode resistor. The clipper tube also performs a bootstrap action, since the transformer secondary is connected to its cathode and is elevated above ground potential by the cathode follower action of the tube during the control pulse development interval. In this manner, a large push-pull voltage is obtained from a simple pulse forming circuit. The screen grid-cathode potential of the clipper tube is maintained substantially constant by the use of a capacitor connected therebetween.

The control pulses so formed are then impressed upon a suitable rectifier arrangement (such as a diode pair, or crystals or the like) whose function is to supply a charge to a condenser in the grid circuit of a modulator bank of tubes in the transmitter, which charge will establish the clamping level of the modulator tubes and which, in itself, will effectively restore the D. C. component which is missing or misrepresented in the composite video signal. During the interval between pulses, the double diode or other rectifier is biased so that no current will flow and the charge established on the modulator grid coupling condenser during the pulse interval will determine the modulator bias during the picture information interval between pulses. Additionally, under conditions of no signal input, the double diode or other rectifier acts as a leak resistance for the coupling condenser, and the transmitter is automatically brought down to the "black" level of operation. Switch means additionally are provided which enables removing the circuit from the transmitter and for supplying fixed bias to the modulator so that the transmitter may be operated without restoration of the D. C. component, if desired.

My invention will best be understood by reference to the drawings in which.

Figures 1, 2, 3, 4, 5:
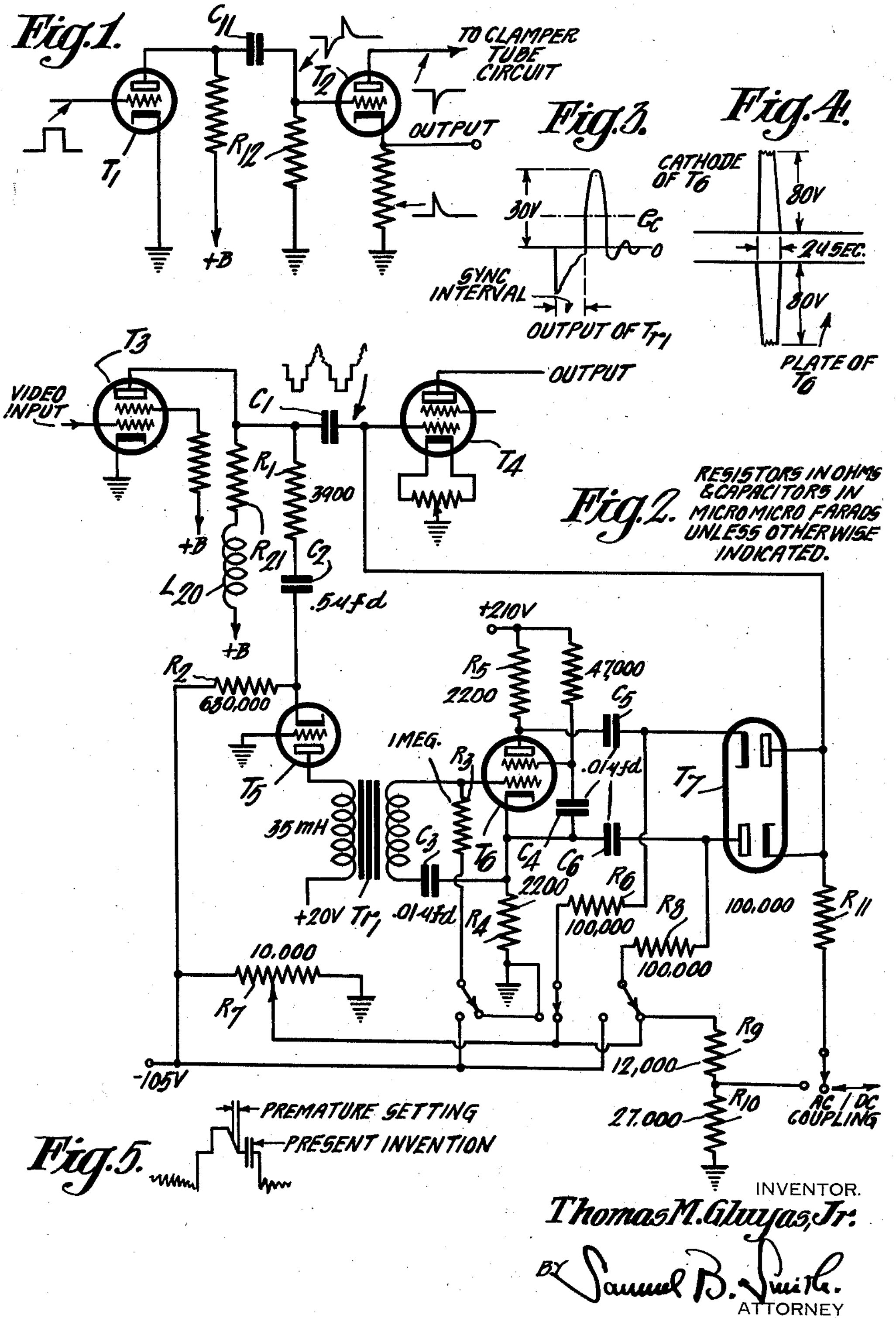
Fig. 1 is a circuit diagram illustrating an arrangement of the prior art.
Fig. 2 is a circuit diagram illustrating one embodiment of my invention.
Figs. 3 through 5 are explanatory curves relating to the operation of the circuit embodiment of Fig. 2.

Referring to Fig. 1, there is shown an arrangement which is illustrative of practice in the prior art to which this invention belongs. The synchronizing signal which had been separated out from the composite video signal, and whose wave shape is shown adjacent the grid of tube $T_1$, is impressed onto the control grid-cathode circuit of this tube and the output circuit of the tube includes a condenser $C_{11}$ serially connected with a resistor $R_{12}$ and forming therewith a short time constant circuit. Effectively, the pulse is differentiated by this circuit and the differentiated pulse so formed is impressed onto the control grid of vacuum tube $T_2$ which passes the portion of the differentiated wave which is formed by the trailing edge of the synchronizing signal. In the output circuit of tube $T_2$ there appears a signal of one phase in the lead connected to the plate of the tube and a signal of reverse phase could be derived from a cathode resistor. The positive signal at the cathode of tube $T_2$ must be less than the signal at the grid of this tube $T_2$. Either one or both of the signals so derived could be used to operate a clamper tube circuit and, as such circuits are well known as illustrated in the U. S. patents referred to hereinbefore in this specification, there is no necessity for specific illustration.

Referring to Fig. 2, there is shown a circuit diagram which is illustrative of one embodiment of my invention. Resistance values have been indicated and are in ohms unless otherwise indicated, and capacity values have been indicated and are in micromicrofarads unless otherwise indicated. This, of course, is purely by way of illustration of one arrangement that has been used satisfactorily with transmitter TT-5A manufactured by the Radio Corporation of America.

The composite video signal comprising the signals representative of the optical values of an image being televised, and the blanking signals with the synchronizing signals superimposed thereon are designated as the video input which is impressed onto one grid of a multigrid tube $T_3$ and which would be illustrative of one of the amplifying tubes, or banks of amplifying tubes, in a television transmitter. The plate of the tube is energized by a source of potential, not shown but indicated by the symbol +B, through a serially connected choke and resistors $L_{20}$ and $R_{21}$ respectively. The output signals from the tube are of the general form as indicated adjacent the output circuit of the tube and, for purposes of illustration only, relative voltage values have been indicated such as are indicative of one particular type of transmission apparatus identified as the aforementioned RCA transmitter TT-5A. These signals are impressed onto the control grid of multigrid tube $T_4$ through condenser $C_1$, which is the clamping or D. C. restoring condenser.

The composite signal from which the D. C. component is missing is impressed onto the cathode of a tube $T_5$ through resistor $R_1$ and condenser $C_2$. This tube $T_5$ is a tube which is utilized for the purpose of separating the synchronizing signal from the composite video signal. The tube has the grid thereof grounded and the plate thereof is energized from a source of positive potential, indicated but not shown, through the primary winding of an iron cored transformer $Tr_1$. The cathode of the tube $T_5$ is connected to a source of negative potential, indicated but not shown, through resistor $R_2$ connected serially therewith.

The secondary of the transformer $Tr_1$ has one terminal thereof connected directly to the control grid of a tube $T_6$ and the other terminal thereof connected to the cathode of this tube through condenser $C_3$. The control grid of the tube is connected to ground through a leak resistor $R_3$. The cathode of the tube is grounded through resistor $R_4$.

The plate circuit of the tube $T_6$ is energized by source of positive potential, indicated but not shown, connected to the plate through resistor $R_5$ and the screen grid of the tube is energized from the same source of potential connected to the screen grid through a 47,000 ohm resistor. Additionally, the screen grid of the tube is connected to the cathode through condenser $C_4$.

Output signals may be taken from both the plate and cathode circuits through coupling condensers $C_5$ and $C_6$ and the signal from the plate is impressed onto the cathode of one section of a double diode tube $T_7$. The signal from the cathode which is developed across resistor $R_4$ is impressed onto the plate of the other section of the double diode $T_7$. The cathode of the tube $T_7$, which is coupled to the plate of tube $T_6$, is returned through resistor $R_6$ to a bias voltage whose value is determined by the setting of potentiometer $R_7$. The plate of the tube $T_7$ which is coupled to the cathode of tube $T_6$ is returned to the aforementioned bias through resistor $R_8$.

One plate of the double diode $T_7$ is connected to the cathode of the other diode section and the two are connected directly to the grid of the bank of modulator tubes which are illustrated as the tube $T_4$. This common connection of the double diode also is connected through resistor $R_{11}$ to a switch, one position of which connects this resistor to the common terminal of resistors $R_9$ and $R_{10}$, and the other, or normal, position of which is open.

The control grid of tube $T_6$, through resistor $R_3$ and resistors $R_6$, $R_8$, and $R_{11}$, are connected to switches which, in one position, allow the normal operation of the device and, in a second position, connect these elements to a source of biasing potential, indicated but not shown, which renders the entire D. C. level setting circuit inoperative. These switches, in actual practice, would all be ganged and so operated simultaneously. The purpose of this arrangement is to render the circuit inoperative where it is desired to apply a sweep video test signal to the transmitter in place of the normal composite video picture signal. The switch biases off the pulse amplifier including tube $T_6$ and the clamping double diode $T_7$ and also provides a fixed bias to the modulator.

The operation of the device is as follows:

Synchronizing signals are separated out from the composite video signal through tube $T_5$ and the synchronizing signal stores energy in transformer $T_1$. The voltage output occurring in the secondary of the transformer is indicated in Fig. 3 of the drawings as that portion of the curve below the zero axis and which has been identified therein as the sync interval. After the occurrence of the sync interval, the tube $T_5$ is cut off and, therefore, does not load the transformer, which oscillates at a resonant frequency which is determined by the parameters of the transformer and by the capacities of the circuits associated therewith. The oscillation is highly damped by iron losses in the core of the transformer $Tr_1$ and additional damping resistances may be shunted across the secondary winding if desired. The pulse which is formed by the oscillation of the transformer is indicated by the curve following that portion of Fig. 3 identified as the sync interval and this pulse is applied between the grid and the cathode of tube $T_6$. This pulse is of sufficient amplitude to make the tube $T_6$ draw grid current which will charge capacitor $C_3$ to a degree where the tube is automatically biased so that only a portion of the pulse formed by oscillation of the transformer is amplified and all of the pulse below a value $e_c$, which is indicated by a dashed line and so identified, is beyond the cutoff point of the tube. Accordingly, this tube acts as a clipper.

The positive portion of the pulse which is above the cutoff value $e_c$ will be amplified by tube $T_6$ and may be squared off at the top in the output circuit of this tube by a proper choice of load resistance which causes limiting in the tube.

The result is that a control pulse has been developed by the synchronizing signal but which does not occur until a time after the synchronizing signal has ceased and the delay and pulse width are constant over a wide range of synchronizing pulse shapes and amplitudes. The general shape of the pulse outputs occurring at the plate of the tube $T_6$ and the pulse developed across the cathode resistor of this tube are shown in Fig. 4 with their relative phases and duration.

The pulses illustrated in Fig. 4 are impressed onto the double diode $T_7$ which is the level setting tube and the output of this tube controls the charge on condenser $C_1$. The level setting and clamping are done in accordance with the principles set forth in Wendt U. S. Patent No. 2,299,945 and, accordingly, do not need to be described in particularity at this point, it being considered sufficient to say that the push-pull control pulses developed in the output circuit of tube $T_7$ cause the double diode to conduct during the pulse interval thereby altering the charge on $C_1$ and setting the voltage at the grid of the tube $T_4$ to the value determined by the setting of $R_7$. Since the clamping action sets the grid voltage of tube $T_4$ to a predetermined value during the black level pedestal interval, and since the black level bears a definite relation to the average brightness of the picture, the D. C. information will be restored.

The action of tube $T_6$ is such that a "boot strap" action is obtained since the transformer $Tr_1$ secondary is connected to the cathode of this tube and is elevated above ground potential by the cathode follower action of the tube during the control pulse interval and, in this manner, a large push-pull voltage is obtained from the relatively simple pulse forming circuit.

Referring to the curve of Fig. 5, there is a curve illustrating what is considered one of the major advantages of the present arrangement over those of the prior art. The synchronizing pulse which is superimposed on the rectangular blanking pulse may not be exactly rectangular in shape and the trailing edge may slope. In the arrangements of the prior art, as illustrated in Fig. 1, the differential pulse developed, and which is used as a control pulse to determine the level setting of the modulator tubes of the transmitter, could occur before the end of the synchronizing pulse and the clamping level could be set up on a portion of the synchronizing signal rather than on the blanking level, the latter being the manner in which it is accomplished in the present invention due to the fact that the control pulses occur only after tube $T_5$ is cut off at the end of the synchronizing signal and accordingly are spaced apart in time therefrom. Since, in the present invention, the clamping is set up on the blanking level rather than on the synchronizing peaks, the grid of the modulator bank is coupled by means of the double diode $T_7$ to the black lever bias control and with no input, the transmitter will return to a black level operating state, and since television transmitters are designed normally to operate continuously at this level and not at the synchronizing signal peak level, a protection is achieved for the no input signal condition.

Having now described the invention, what is claimed and desired to be secured by Letters Patent is the following:

What I claim is:

1. The method of restoring the direct current component to a signal which has been at least partially removed therefrom which includes the steps of; deriving recurrent pulses from said signal, storing energy under the control of the recurrent pulses, developing control signals under the influence of the stored energy during the interval between recurrences of the pulses, storing electrical energy under the control of said control signals, establishing concomitantly with the occurrence of said control signals a clamping voltage datum from energy stored under the control of said control signals and restoring the direct current component by clamping the peaks of said signals, having the direct current component absent, to said voltage datum.

2. Apparatus for restoring the direct current component to a signal from which it has been at least partially removed comprising an oscillatory circuit means for deriving recurring pulses from said signal, means for storing energy in said oscillatory circuit under the influence of said pulses, means responsive to said signal to interrupt the storing of energy in the oscillatory circuit to allow the circuit to oscillate means for damping said oscillatory circuit so as to substantially quench free oscillation thereof after one cycle of such free oscillation, and means to restore the direct current component in accordance with the peak value of said one cycle of free oscillation so produced.

3. Apparatus for restoring the direct current component of a signal from which it has been removed, said signal incorporating a series of timing pulses each followed by a datum level representation, a transformer having primary and secondary windings, means for impressing at least the timing pulse portion of said signal onto the primary winding of the transformer to store energy in the transformer, a resonant circuit including the secondary winding of the transformer, damping means for substantially quenching free oscillation of said resonant circuit after one cycle of free oscillation, means for causing the stored energy in the transformer to produce free oscillation in the resonant circuit to thereby develop a series of control signals, each representing a peak of a free oscillation cycle, the resonant frequency of the resonant circuit being adjusted such that the production of said control signals occurs only during the datum level representation of the signal, rectifying means arranged as a keyed clamping circuit, means for impressing representations of said control signals onto said rectifying means for keying thereof and means to restore the direct current component to the signal by clamping peaks thereof by said clamping circuit only during keyed periods thereof.

4. Apparatus for restoring the direct current component to an incoming signal from which it has been at least partially removed comprising a first thermionic tube, a source of signals containing synchronizing pulses, means for impressing said signals onto said thermionic tube, a transformer having primary and secondary windings, means connecting the primary winding of the transformer in the output circuit of said thermionic tube whereby energy is stored in said transformer during the periods of occurrence of the synchronizing signals, a second thermionic tube having anode, cathode, and control electrodes, means connecting the secondary winding of said transformer to a control electrode-cathode circuit of the second thermionic tube, means for damping said transformer such that inherent free oscillation thereof following said synchronizing pulse is substantially quenched after one cycle of free oscillation, a keyable signal clamping circuit having supplied thereto the incoming signal connections applying the output of said second thermionic tube for keying said clamping circuit only during said one cycle of free oscillation and means establishing a predetermined clamping level for said clamping circuit to which clamping level predetermined peaks of said incoming signal other than said synchronizing pulses are to be clamped thereby to establish a D.C. component in said incoming signal.

5. Apparatus in accordance with claim 4 wherein said clamping circuit is of the push-pull variety and there is provided, in addition, resistance means connected in the cathode-ground circuit of said second thermionic tube, resistance means connected between the control electrode of said tube and ground, and means for deriving signals from the anode of the tube and from the cathode-ground circuit of the tube whereby the keying signals derived from said tube are substantially the same value and opposing phase for push-pull keying of said clamping circuit.

6. Apparatus according to claim 5 wherein said push-pull clamping circuit includes two rectifying devices each having at least an anode and a cathode, a connection between the anode of one device and the cathode of the other device to form an input terminal, a resistive load connected between the remaining anode and cathode of the two devices, and wherein said clamp circuit is supplied with incoming signal by applying the incoming signal to said input terminal, and wherein said connections applying the output of said second thermionic tube to said clamping circuit comprises a push-pull coupling arrangement from the anode-cathode circuit of said second thermionic tube to separate points on said resistive load.

7. In television transmission apparatus wherein there is developed a composite signal including signals representative of the optical values of an image being televised and two sets of recurrent signals occurring in pairs, the former of each pair representing picture synchronizing information while the latter of each pair has a value bearing a definite relationship to the direct current component of said composite signal and wherein the direct current component of said composite signal has been at least partially lost, apparatus for restoring the direct current component to the composite signal comprising means for separating the synchronizing signals and signals bearing the definite relationship to the direct current component from the signals representative of the optical values of the image being televised, a resonant circuit, means for storing energy in said resonant circuit under the influence of the synchronizing signals, means for damping said resonant circuit to restrict inherent free oscillation thereof such to produce a well defined major cycle of free oscillation after excitation by each of said synchronizing pulses, means for converting each major free oscillation into a control pulse having its beginning defined at a time subsequent to the end of each synchronizing pulse but during said latter of each recurring signal pair, a keyable signal clamping circuit connected for keying by said control pulse and connections applying said composite signal to said clamping circuit thereby to clamp peaks of the signal.

8. Apparatus for restoring the direct current component to a composite signal of a type suited for application to the modulator input of a television transmitter, said signal comprising video, frame and line synchronizing pulses, and blanking signals from which composite signal the direct current component has been at least partially removed, comprising in combination, means responsive only to the synchronizing signals to derive from said composite signals representations thereof, means for storing energy under the influence of the derived signals, a damped resonant circuit, means to allow the stored energy to oscillate in the resonant circuit to develop a damped wave train for each synchronizing signal, a thermionic tube connected with said resonant circuit so as to pass only a major cycle of each damped oscillation wave train means to limit the amplitude of the wave train passed by said tube to form a control signal occurring only during a blanking signal period, a source of clamping datum potential, a capacitor coupling composite signal to the modulator input of a transmitter, a unilaterally conductive device connected between said source of clamping datum potential and the modulator side of said capacitor, and means for rendering said unilaterally conductive device conductive only in accordance with said control signals.

9. Apparatus in accordance with claim 8 wherein said unilaterally conductive device is supplemented by another unilaterally conductive device connected therewith in a push-pull keyed clamping circuit arrangement and wherein said thermionic tube has a cathode resistor connected in the cathode circuit thereof and wherein a push-pull signal output is obtained therefrom from the anode and cathode circuits of the tube for keying of said push-pull clamping circuit arrangement.

10. Apparatus in accordance with claim 8 where in there is provided a source of energizing potential of predetermined value, switch means interposed between the thermionic tube and the source of energizing potential and the unilaterally conductive means and the source of potential, said switch means being operable to remove the direct current restoring apparatus from an operative relationship with respect to the modulator and simultaneously set the operating level of the modulator at a predetermined value to allow testing of the transmitter.

11. Apparatus according to claim 2 wherein the frequency of oscillatory circuit free oscillation is determined at such a value that said direct current component restoring means acts to restrict D. C. restoration to the signal only during control periods defined by the duration of one-half cycle of oscillatory circuit free oscillation.

THOMAS M. GLUYAS, Jr.

REFERENCES CITED

The following references are of record in the file of this patent:

UNITED STATES PATENTS

| Number | Name | Date |
|---|---|---|
| 2,158,261 | Urtel | May 16, 1939 |
| 2,227,056 | Blumlein | Dec. 31, 1940 |
| 2,292,816 | Bedford | Aug. 11, 1942 |
| 2,307,375 | Blumlein | Jan. 5, 1943 |
| 2,363,813 | Somers | Nov. 28, 1944 |

FOREIGN PATENTS

| Number | Country | Date |
|---|---|---|
| 848,207 | France | Oct. 25, 1939 |
| 851,899 | France | Jan. 16, 1940 |